US009753537B2

United States Patent
Obana et al.

(10) Patent No.: US 9,753,537 B2
(45) Date of Patent: Sep. 5, 2017

(54) APPARATUS, INFORMATION PROCESSING PROGRAM, SYSTEM, AND METHOD FOR CONTROLLING VIBRATIONS TO BE IMPARTED TO A USER OF AN APPARATUS

(71) Applicant: NINTENDO CO., LTD., Kyoto (JP)

(72) Inventors: Kazutoshi Obana, Kyoto (JP); Kochi Kawai, Kyoto (JP); Junichiro Miyatake, Nagaokakyo (JP); Keisuke Seko, Kyoto (JP); Shoji Masubuchi, Kyoto (JP); Takafumi Aoki, Kyoto (JP); Kei Yamashita, Kyoto (JP); Masahiko Inami, Yokohama (JP); Kouta Minamizawa, Yokohama (JP)

(73) Assignee: NINTENDO CO., LTD., Kyoto (JP)

( * ) Notice: Subject to any disclaimer, the term of this patent is extended or adjusted under 35 U.S.C. 154(b) by 202 days.

(21) Appl. No.: 14/676,891

(22) Filed: Apr. 2, 2015

(65) Prior Publication Data
US 2015/0323996 A1 Nov. 12, 2015

(30) Foreign Application Priority Data
May 9, 2014 (JP) ................. 2014-097359

(51) Int. Cl.
*G06F 3/01* (2006.01)
*G08B 6/00* (2006.01)
*A63F 13/2145* (2014.01)
*A63F 13/54* (2014.01)
(Continued)

(52) U.S. Cl.
CPC .......... *G06F 3/016* (2013.01); *A63F 13/2145* (2014.09); *A63F 13/285* (2014.09); *A63F 13/54* (2014.09); *G08B 6/00* (2013.01); *A63F 13/92* (2014.09); *A63F 2300/1037* (2013.01); *A63F 2300/204* (2013.01); *A63F 2300/6063* (2013.01)

(58) Field of Classification Search
CPC ........ G06F 3/016; A63F 13/285; A63F 13/54; A63F 13/2145; A63F 13/92; A63F 2300/204; A63F 2300/6063; A63F 2300/1037
See application file for complete search history.

(56) References Cited

U.S. PATENT DOCUMENTS

2001/0049302 A1 12/2001 Hagiwara et al.
2002/0163498 A1 11/2002 Chang et al.
2006/0046843 A1 3/2006 Nakajima
(Continued)

FOREIGN PATENT DOCUMENTS

| EP | 0 952 555 | 10/1999 |
|----|-----------|---------|
| JP | 2006-68210 | 3/2006 |
| WO | WO 03/032289 | 4/2003 |

OTHER PUBLICATIONS

European Search Report (8 pages) dated Sep. 14, 2015, issued in corresponding EP Application No. 15162628.0.

Primary Examiner — Ryan A Lubit
(74) Attorney, Agent, or Firm — Nixon & Vanderhye PC

(57) ABSTRACT

An information processing apparatus for outputting a predetermined sound selectively from a plurality of sound output apparatuses and vibrating a predetermined vibration apparatus selects from the plurality of sound output apparatuses a sound output apparatus to output the sound, performs vibration control for vibrating the vibration apparatus, and performs different types of vibration control in accordance with the selected sound output apparatus.

27 Claims, 7 Drawing Sheets

(51) Int. Cl.
     *A63F 13/285*     (2014.01)
     *A63F 13/92*      (2014.01)

(56)            References Cited

U.S. PATENT DOCUMENTS

2007/0248235  A1*  10/2007  Hamada .................. A63F 13/10
                                                       381/99
2011/0148608  A1*   6/2011  Grant ..................... G06F 1/1626
                                                       340/407.2
2015/0061846  A1*   3/2015  Yliaho .................... G06F 3/016
                                                       340/407.1

* cited by examiner

APPARATUS, INFORMATION PROCESSING PROGRAM, SYSTEM, AND METHOD FOR CONTROLLING VIBRATIONS TO BE IMPARTED TO A USER OF AN APPARATUS

CROSS REFERENCE TO RELATED APPLICATION

The disclosure of Japanese Patent Application No. 2014-097359, filed on May 9, 2014, is incorporated herein by reference.

FIELD

The technology shown here relates to an information processing apparatus, a storage medium having stored therein an information processing program, an information processing system, and an information processing method, and in particular, relates to an information processing apparatus, an information processing system, and an information processing method for, for example, controlling vibrations to be imparted to a user of an apparatus, and a storage medium having stored therein an information processing program for, for example, controlling vibrations to be imparted to a user of an apparatus.

BACKGROUND AND SUMMARY

Conventionally, a game apparatus for imparting vibrations to the main body of the apparatus is known. For example, the game apparatus imparts vibrations to the main body of the apparatus in accordance with the game situation and transmits the vibrations to the fingers and the hands of a user holding the apparatus.

In the game apparatus, however, the vibrations to be imparted to the fingers and the hands of the user have a single form.

Therefore, it is an object of an exemplary embodiment to provide an information processing apparatus, an information processing system, and an information processing method that are capable of performing vibration control for vibrating a vibration apparatus, and a storage medium having stored therein an information processing program capable of performing vibration control for vibrating a vibration apparatus.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing apparatus according to an exemplary embodiment, an information processing apparatus outputs a predetermined sound selectively from a plurality of sound output apparatuses and vibrates a predetermined vibration apparatus. The information processing apparatus includes one or more processors configured to: select from the plurality of sound output apparatuses a sound output apparatus to output the sound; and perform vibration control for vibrating the vibration apparatus, wherein in the vibration control, different types of vibration control are performed in accordance with the sound output apparatus selected in the selection.

Based on the above, it is possible to perform vibration control for vibrating a vibration apparatus, in accordance with a sound output apparatus to output a sound.

In addition, in the vibration control, a vibration signal for vibrating the vibration apparatus may be processed in accordance with the sound output apparatus selected in the selection, thereby performing different types of vibration control.

Based on the above, it is easy to perform vibration control corresponding to the sound output apparatus to output the sound.

In addition, in the vibration control, frequency components in an audible range of the vibration signal may be reduced in accordance with the sound output apparatus selected in the selection.

Based on the above, frequency components in the audible range of a vibration signal are reduced, whereby it is possible to reduce a vibration sound when a vibration apparatus vibrates.

In addition, in the vibration control, a magnitude of energy for vibrating the vibration apparatus based on the vibration signal may be changed in accordance with the sound output apparatus selected in the selection.

Based on the above, the magnitude of energy for vibrating a vibration apparatus based on a vibration signal is changed, whereby it is possible to change a vibration sound when a vibration apparatus vibrates.

In addition, the information processing apparatus may further include a storage unit. The storage unit stores a vibration signal for vibrating the vibration apparatus and a processed vibration signal obtained by processing the vibration signal. Either the vibration signal or the processed vibration signal may be selected for use in the vibration control in accordance with the sound output apparatus selected in the selection.

Based on the above, a vibration signal is prepared in advance, thereby reducing processing load for vibration control.

In addition, the plurality of sound output apparatuses may include a first sound output apparatus configured to output a sound to a user and a person other than the user, and a second sound output apparatus configured to output a sound to the user. In the selection, one of the first sound output apparatus and the second sound output apparatus may be selected.

Based on the above, it is possible to perform vibration control in accordance with a user using the sound output apparatus.

In addition, if the second sound output apparatus has been selected in the selection, the vibration control may be performed so that a vibration sound to be produced by the vibration apparatus becomes smaller.

Based on the above, if a second sound output apparatus configured to output a sound to the user has been selected as the output destination of a sound, a vibration sound becomes smaller. This results in a suitable environment in a situation where a sound cannot be output to the outside, and the like.

In addition, in the vibration control, if the second sound output apparatus has been selected in the selection, frequency components in an audible range of a vibration signal for vibrating the vibration apparatus may be reduced, thereby making the vibration sound smaller.

Based on the above, frequency components in an audible range of a vibration signal are reduced. This results in a suitable environment in a situation where a sound cannot be output to the outside, and the like.

In addition, if the second sound output apparatus has been selected in the selection, energy for vibrating the vibration apparatus based on a vibration signal for vibrating the vibration apparatus may be made smaller, thereby making the vibration sound smaller.

Based on the above, the energy for vibrating the vibration apparatus is made smaller based on the vibration signal. This results in a suitable environment in a situation where a sound cannot be output to the outside.

In addition, the first sound output apparatus may be a loudspeaker.

Based on the above, it is possible to perform different types of vibration control based on whether the sound output apparatus is a loudspeaker for outputting a sound to a user and a person other than the user, or another sound output apparatus for outputting a sound to the user.

In addition, the second sound output apparatus may be headphones.

Based on the above, it is possible to perform different types of vibration control based on whether the sound output apparatus is headphones for outputting a sound to a user, or another sound output apparatus for outputting a sounds to the user or a person other than the user.

In addition, the vibration signal may be a signal including frequency components in an audible range.

Based on the above, it is possible, based on the selected sound output apparatus, to process a vibration signal capable of causing the vibration apparatus to generate a vibration sound.

In addition, the vibration signal may be an analog signal.

Based on the above, the vibration apparatus is driven by an analog signal, whereby it is possible to easily vibrate a vibration section.

In addition, the information processing apparatus may be a portable apparatus into which the vibration apparatus and at least one of the plurality of sound output apparatuses are built. In this case, in the vibration control, different types of vibration control may be performed in accordance with whether or not the at least one sound output apparatus built into the information processing apparatus has been selected in the selection.

Based on the above, it is possible to perform different types of vibration control in accordance with whether or not a sound output apparatus built into a portable apparatus has been selected as the output destination of a sound.

In addition, the one or more processors may be further configured to control a sound to be output to the sound output apparatus. The information processing apparatus may further include a display screen. The one or more processors may be further configured to control an image to be displayed on the display screen. In this case, in the control of the sound, a sound may be controlled in accordance with an image to be displayed on the display screen. In the vibration control, a vibration may be controlled in accordance with the image to be displayed on the display screen.

Based on the above, it is also possible, in the portable apparatus including a display screen, to perform vibration control corresponding to an image to be displayed on the display screen.

In addition, the vibration apparatus built into the information processing apparatus may be provided on each of the left and right of a main body of the portable apparatus. In this case, the vibration control may be performed for the pair of vibration apparatuses provided on the left and right.

Based on the above, vibration apparatuses provided on the left and right of the main body of the portable apparatus are used, whereby it is possible to perform vibration control so that the vibration source moves in a left-right direction.

In addition, the at least one sound output apparatus built into the information processing apparatus may be stereo loudspeakers. In this case, in the control of the sound, stereo sounds to be output to the sound output apparatus may be controlled.

Based on the above, stereo loudspeakers provided in the portable apparatus are used, whereby it is possible to output sounds of which the sound sources are localized at various positions.

In addition, in the vibration control, vibration energy for vibrating the vibration apparatus may be controlled in accordance with each of volumes of sounds output from the plurality of sound output apparatuses and to be felt as bodily sensation by a user.

Based on the above, it is possible to control vibration energy to be the magnitude of a vibration corresponding to the volume of a sound to be felt as bodily sensation by a user.

In addition, in the vibration control, the vibration energy may be controlled so that the greater the volumes of the sounds, the greater the vibration energy.

Based on the above, it is possible to perform control so that the greater the volume of the sound to be felt as bodily sensation by the user, the greater the vibration.

In addition, in the vibration control, control may be performed to vibrate the vibration apparatus by a vibration synchronized with the sound to be output, and in accordance with the sound output apparatus selected in the selection, timing to synchronize the vibration with the sound may be changed by shifting the timing by a predetermined time.

Based on the above, at the timing to output a sound, it is possible to impart a vibration synchronized with the sound to the main body of the information processing apparatus by shifting the timing of the vibration by a predetermined time.

In addition, the exemplary embodiment may be carried out in the form of an information processing program, an information processing system, or an information processing method.

According to the exemplary embodiment, it is possible to perform vibration control for vibrating a vibration apparatus, in accordance with a sound output apparatus to output a sound.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

With reference to the drawings, an information processing apparatus for executing an information processing program according to an exemplary embodiment is described. While the information processing program according to the exemplary embodiment can be applied by being executed by any computer system, a mobile information processing apparatus 3 (a tablet terminal) is used as an example of the information processing apparatus, and the information processing program according to the exemplary embodiment is described using an information processing program executed by the information processing apparatus 3. For example, the information processing apparatus 3 can execute a program and a pre-installed program (e.g., a game program) stored in a storage medium such as an exchangeable optical disk or an exchangeable memory card, or received from another apparatus. As an example, the information processing apparatus 3 can display on a screen an image generated by a computer graphics process, such as a virtual space image viewed from a virtual camera set in a virtual space. The information processing apparatus 3 may be a device such as a general personal computer, a stationary game apparatus, a mobile phone, a mobile game apparatus, or a PDA (Personal Digital Assistant). It should be noted that FIG. 1 is a plan view of an example of the external appearance of the information processing apparatus 3.

Figure 1:
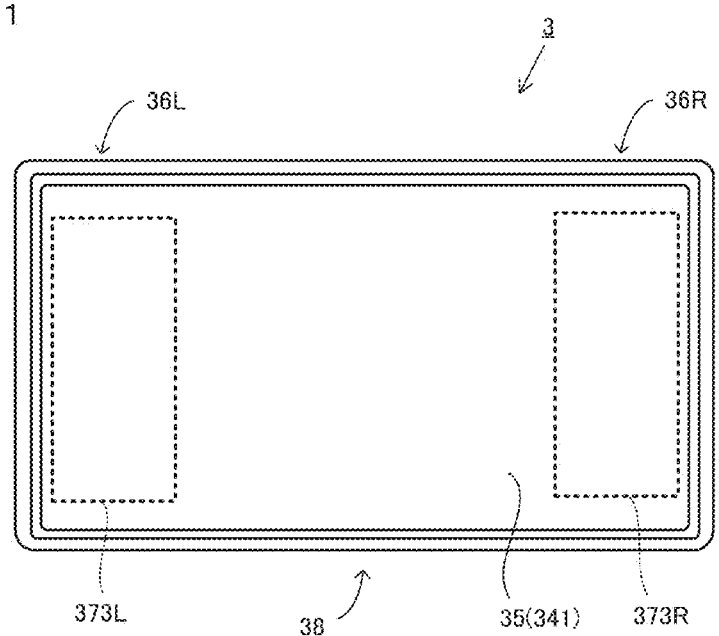
FIG. 1 is a plan view of a non-limiting example of the external appearance of an information processing apparatus 3 according to an exemplary embodiment.

In FIG. 1, the information processing apparatus 3 includes a display section 35, a sound output section 36, a sound output terminal 38, and an actuator 373. As an example, the display section 35 is provided on the front surface of the main body of the information processing apparatus 3. For example, the display section 35 includes an LCD (Liquid Crystal Display) and may employ, for example, a display device using EL. Further, the display section 35 may be a display device capable of displaying a stereoscopically viewable image.

A touch panel 341, which is an example of an input section 34, is provided so as to cover a display screen of the display section 35. The touch panel 341 detects the position of an input provided to a predetermined input surface (e.g., the display screen of the display section 35). It should be noted that the input section 34 is an input device that allows a user of the information processing apparatus 3 to input an operation, and the input section 34 may be any input device. For example, as the input section 34, an operation section such as a slide pad, an analog stick, a directional pad, an operation button, or the like may be provided on the side surfaces, the back surface, or the like of the main body of the information processing apparatus 3. Further, the input section 34 may be a sensor for detecting the orientation and the motion of the main body of the information processing apparatus 3. For example, the input section 34 may be an acceleration sensor for detecting the acceleration generated in the main body of the information processing apparatus 3, an angular velocity sensor (a gyro sensor) for detecting the amount of rotation of the main body of the information processing apparatus 3, or the like.

The sound output section 36 includes loudspeakers for outputting sounds, and in the example shown in FIG. 1, includes a pair of stereo loudspeakers (a left loudspeaker 36L and a right loudspeaker 36R) provided on the left and right of the upper side surface or the back surface of the information processing apparatus 3. The sound output section 36 performs D/A conversion on sound signals (a left sound control signal and a right sound control signal) output from a control section 31 described later, thereby generating analog sound signals (a left analog sound signal and a right analog sound signal). Then, the sound output section 36 outputs the analog sound signals to the loudspeakers (e.g., the stereo loudspeakers), thereby outputting sounds. Further, if a connection terminal has been connected to the sound output terminal 38, the sound output section 36 outputs the analog sound signals to the sound output terminal 38 instead of the loudspeakers and outputs to the control section 31 a sound switching signal indicating that the connection terminal has been connected to the sound output terminal 38 and the sound output destination has been switched.

The actuator 373 is a vibration actuator (a vibrator) for imparting predetermined vibrations to the main body of the information processing apparatus 3 and is included in a vibration generation section 37 described later. In the example shown in FIG. 1, the actuator 373 includes a left actuator 373L, which is provided on the left and inside the main body of the information processing apparatus 3, and a right actuator 373R, which is provided on the right and inside the main body of the information processing apparatus 3. Specifically, as indicated by dashed line areas in FIG. 1, the left actuator 373L is provided on the left side of the display section 35, which is a position near the left hand of the user when holding a left end portion of the information processing apparatus 3 in the left hand. Further, the right actuator 373R is provided on the right side of the display section 35, which is a position near the right hand of the user when holding a right end portion of the information processing apparatus 3 in the right hand. Further, the vibration generation section 37 performs D/A conversion on vibration control signals (a left vibration control signal and a right vibration control signal) output from the control section 31 described later, thereby generating analog vibration signals (a left analog vibration signal and a right analog vibration signal). Then, the vibration generation section 37 outputs driving signals obtained by amplifying the analog vibration signals to the actuator 373 (the left actuator 373L and the right actuator 373R), thereby driving the actuator 373.

It should be noted that as is clear from FIG. 1, the display screen of the display section 35, the left sound output section 36L, and the right sound output section 36R, which are provided in the information processing apparatus 3, are placed at positions close to one another. The display screen of the display section 35, the left actuator 373L, and the right actuator 373R are placed at positions close to one another. Further, the left sound output section 36L and the left actuator 373L are placed at positions close to each other, but are different units disposed at different positions. The right sound output section 36R and the right actuator 373R are placed at positions close to each other, but are different units disposed at different positions. Consequently, it is possible to include a unit dedicated to outputting vibrations and a unit dedicated to outputting sounds. Thus, it is possible to output vibrations and sounds more accurately than when a general-purpose unit is shared. It should be noted that modules into which a unit for outputting vibrations and a unit for outputting sounds are combined and integrated may be provided on the left and right of the information processing apparatus 3.

The sound output terminal 38 is a terminal for outputting sound signals to a sound output apparatus provided outside the information processing apparatus 3. For example, the sound output terminal 38 is connected to a connection terminal provided in a cord for connecting to an apparatus for outputting sounds by being attached to the head or the ears of the user, such as headphones or earphones, external loudspeakers, or the like. Then, if the connection terminal has been connected to the sound output terminal 38, the sound output terminal 38 outputs to the sound output section 36 a signal indicating that the connection terminal has been connected to the sound output terminal 38. It should be noted that the mechanism for detecting that the connection terminal has been connected to the sound output terminal 38 may use any method. For example, for detection, it may be determined, using a physical circuit, whether or not the connection terminal is connected to the sound output terminal 38. Alternatively, the presence or absence of a connection to the sound output terminal 38 may be detected using an additional function (e.g., a switch function for detecting that the connection terminal has been connected) included in the connection terminal.

Figure 2:
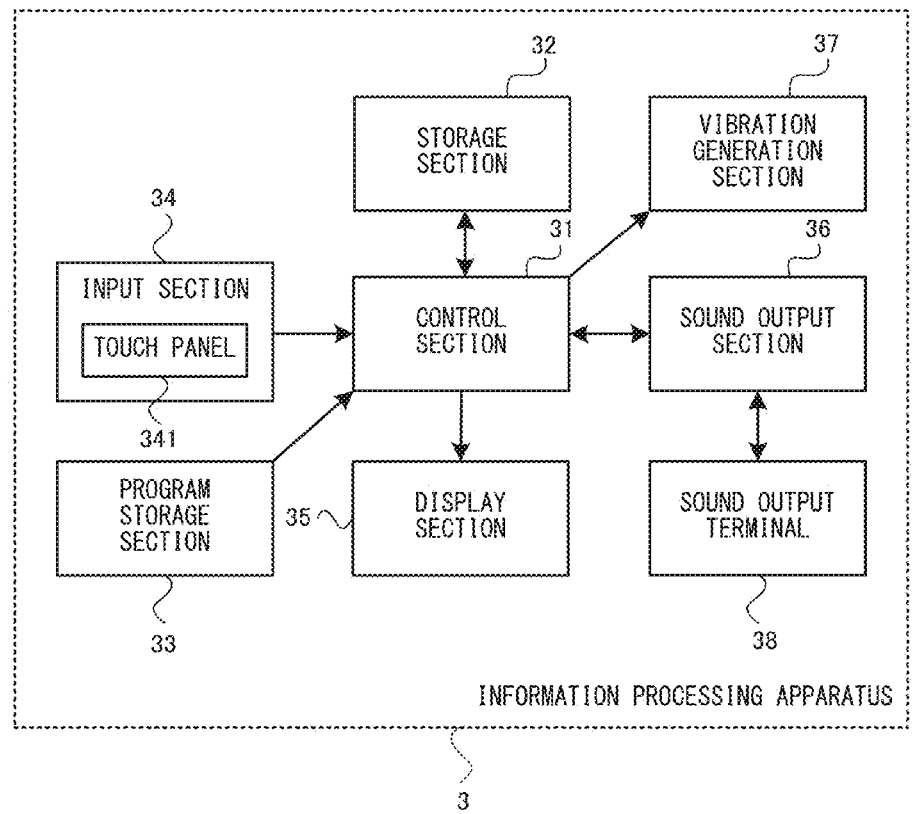
FIG. 2 is a block diagram showing a non-limiting example of the configuration of the information processing apparatus 3.

Next, with reference to FIG. 2, the internal configuration of the information processing apparatus 3 is described. It should be noted that FIG. 2 is a block diagram showing an example of the configuration of the information processing apparatus 3.

In FIG. 2, the information processing apparatus 3 includes the control section 31, a storage section 32, and a program storage section 33 in addition to the input section 34, the display section 35, the sound output section 36, the vibration generation section 37, and the sound output terminal 38, which are described above. It should be noted that the information processing apparatus 3 may be composed of one or more apparatuses including: an information processing apparatus having at least the control section 31; and another apparatus.

The control section 31 is information processing means (a computer) for performing various types of information processing and is, for example, a CPU. The control section 31 has the function of performing, as the various types of information processing, processing or the like corresponding to an operation performed on the input section 34 by the user. For example, the functions of the control section 31 are achieved by, for example, the CPU executing a predetermined program.

As the various types of information processing, the control section 31 controls the display of an image to be displayed on the display section 35. Further, as the various types of information processing, the control section 31 outputs, to the sound output section 36, sound control signals (e.g., digital sound signals) for controlling sounds to be output from the stereo loudspeakers or the sound output terminal 38. Further, as the various types of information processing, the control section 31 outputs, to the vibration generation section 37, vibration control signals (e.g., digital vibration signals) for controlling vibrations of the actuator 373 (the left actuator 373L and the right actuator 373R).

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus 3 having the control section 31, or may be a storage medium detachably attached to the information processing apparatus 3 having the control section 31. Alternatively, the program storage section 33 may be a storage device (a server or the like) connected to the control section 31 via a network. The control section 31 (the CPU) may read a part or all of the program to the storage section 32 at appropriate timing and execute the read program.

Figure 3:
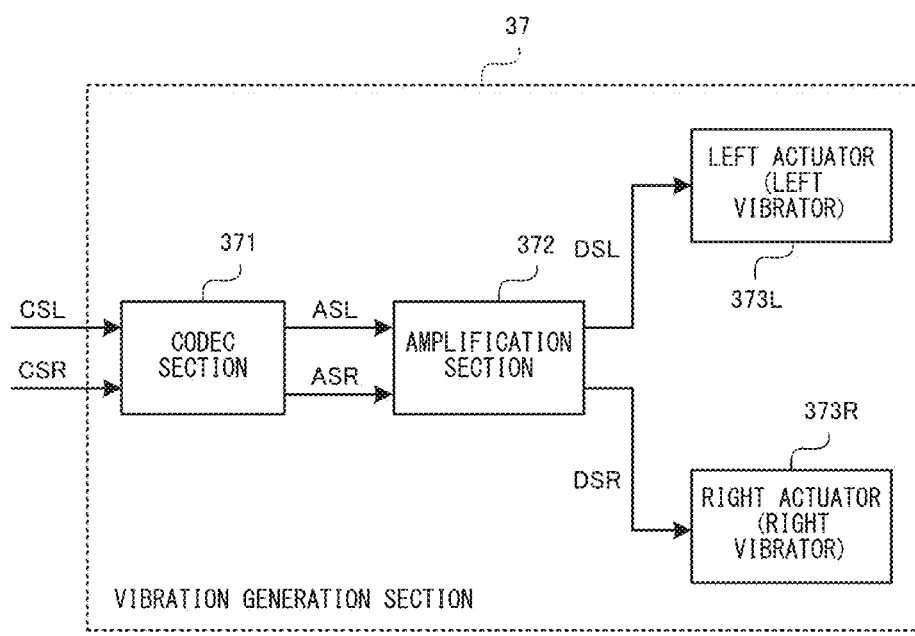
FIG. 3 is a block diagram showing a non-limiting example of the configuration of a vibration generation section 37.

Next, with reference to FIG. 3, the configuration of the vibration generation section 37 is described. It should be noted that FIG. 3 is a block diagram showing an example of the configuration of the vibration generation section 37.

In FIG. 3, the vibration generation section 37 includes a codec section 371, an amplification section 372, the left actuator (left vibrator) 373L, and the right actuator (right vibrator) 373R.

The codec section 371 acquires vibration control signals output from the control section 31 and performs a predetermined decoding process on the vibration control signals, thereby generating analog vibration signals. Then, the codec section 371 outputs the analog vibration signals to the amplification section 372. For example, if a plurality of actuators 373 are provided and independent vibrations are generated by the respective actuators 373 (e.g., the left actuator 373L and the right actuator 373R), the control section 31 outputs vibration control signals (e.g., a left vibration control signal CSL and a right vibration control signal CSR) for controlling vibrations in the respective actuators 373. In this case, the codec section 371 decodes the vibration control signals output from the control section 31, thereby generating analog vibration signals (e.g., a left analog vibration signal ASL and a right analog vibration signal ASR) for generating vibrations in the respective actuators 373. Then, the codec section 371 outputs the analog vibration signals to the amplification section 372.

The amplification section 372 amplifies the analog vibration signals output from the codec section 371, thereby generating driving signals for driving the actuator 373. Then, the amplification section 372 outputs the driving signals to the actuator 373. For example, if a plurality of actuators 373 are provided (e.g., if the left actuator 373L and the right actuator 373R are provided), the amplification section 372 increases changes in the amplitudes of the current and/or the voltage of each of the analog vibration signals (e.g., the left analog vibration signal ASL and the right analog vibration signal ASR) output from the codec section 371, thereby generating driving signals (e.g., a left driving signal DSL and a right driving signal DSR). Then, the amplification section 372 outputs the driving signals to the respective actuators 373 (e.g., the left actuator 373L and the right actuator 373R). It should be noted that when adjusting the output gain in accordance with an instruction from the control section 31, the amplification section 372 acquires output gain adjustment instruction data from the amplification section 372 and changes the output gain (e.g., an amplification factor for amplifying an analog vibration signal) in accordance with the acquired output gain adjustment instruction data.

The actuator 373 is driven in accordance with the driving signals output from the amplification section 372, thereby imparting vibrations corresponding to the driving signals to the main body of the information processing apparatus 3. For example, as shown in FIG. 1, the actuator 373 includes the left actuator 373L and the right actuator 373R, which are provided on the left side and the right side of the main body of the information processing apparatus 3 with respect to the center of the display screen of the display section 35. As an example, the left actuator 373L is placed in a part of the main body of the information processing apparatus 3 that is held by the user in the left hand, and the right actuator 373R is placed in a part of the main body of the information processing apparatus 3 that is held by the user in the right hand. Here, the method of the actuator 373 imparting vibrations to the main body of the information processing apparatus 3 may be any method. For example, the actuator 373 may use the method of generating vibrations by an eccentric motor (ERM: Eccentric Rotating Mass), the method of generating vibrations by a linear vibrator (LRA: Linear Resonant Actuator), the method of generating vibrations by a piezoelectric element, or the like. If the driving signals to be output from the amplification section 372 are generated in accordance with the method of the actuator 373 generating vibrations, an actuator using any method can impart various vibrations to the user of the information processing apparatus 3.

It should be noted that in the configuration of the vibration generation section 37, one or more codec sections and one or more amplification sections may be provided. For example, a codec section and an amplification section can be provided in each of a plurality of actuators 373 that are provided. In the above description, an example has been used where driving signals for driving the actuator 373 are generated by amplifying the analog vibration signals generated by the codec section 371. Alternatively, the signals output from the codec section 371 to the amplification section 372 may be digital signals. For example, if the actuator 373 is driven by pulse width modulation (PWM) control, the codec section 371 may generate pulse signals for turning on and off the actuator 373. In this case, the signals output from the codec section 371 to the amplification section 372 are digital vibration signals for controlling the driving of the actuator 373 using pulse waves. Consequently, the amplification section 372 amplifies the digital vibration signals.

Figure 4:
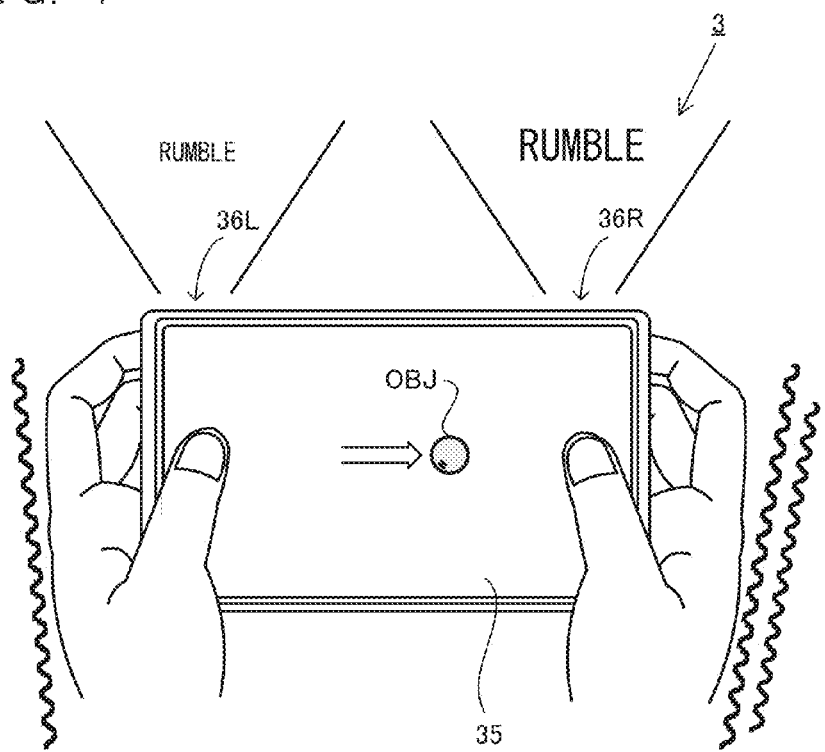
FIG. 4 is a diagram showing a non-limiting example where the main body of the information processing apparatus 3 vibrates, and simultaneously, sounds are output, in accordance with the display position of a virtual object OBJ displayed on a display screen of a display section 35.
Figure 4:
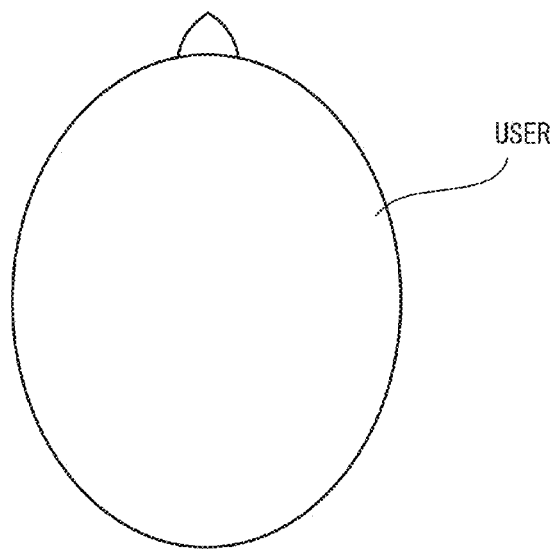
Figure 5:
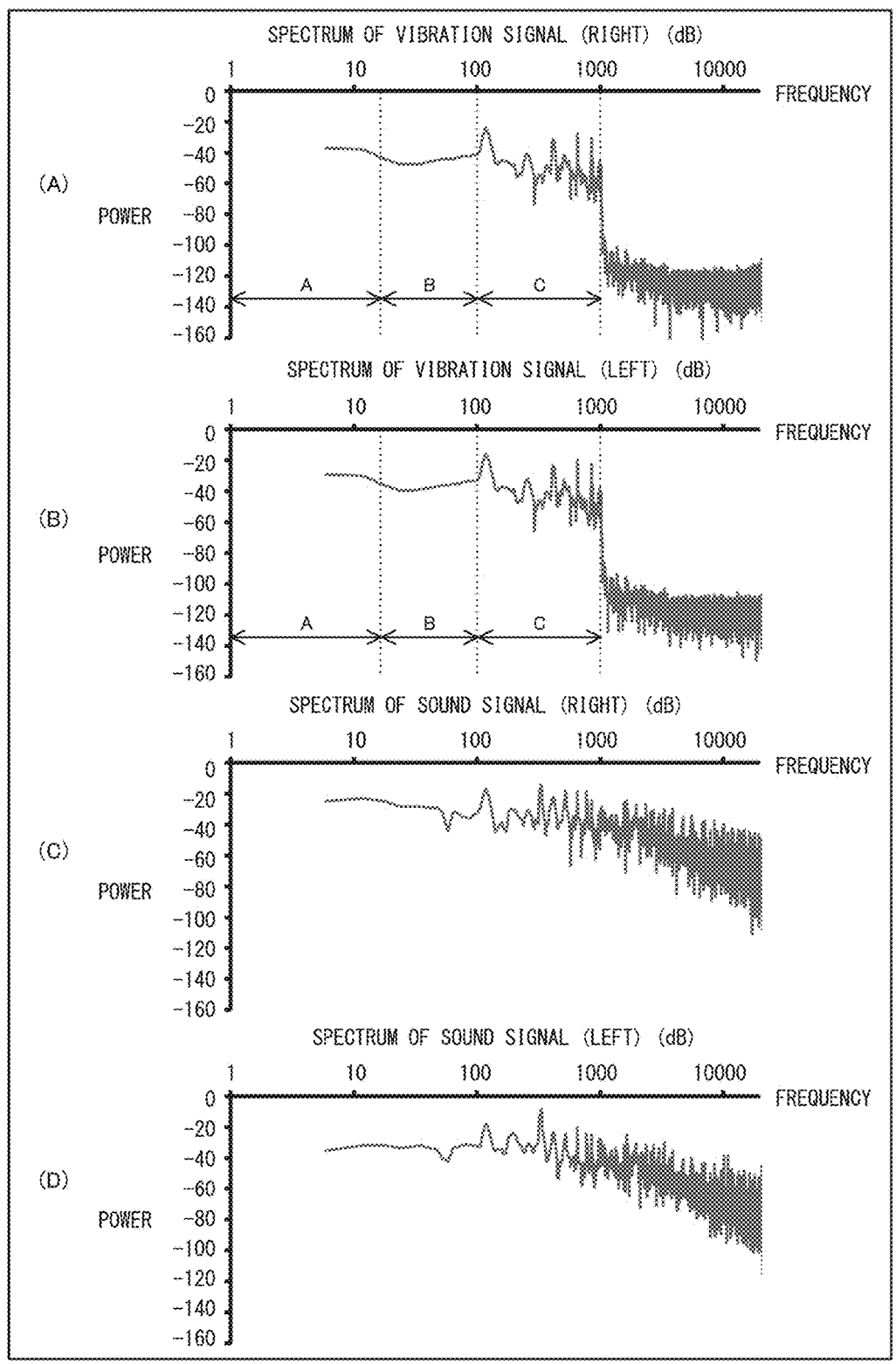
FIG. 5 is diagrams illustrating non-limiting examples of vibrations imparted to the main body of the information processing apparatus 3 and non-limiting examples of sounds output from the information processing apparatus 3.
Figure 6:
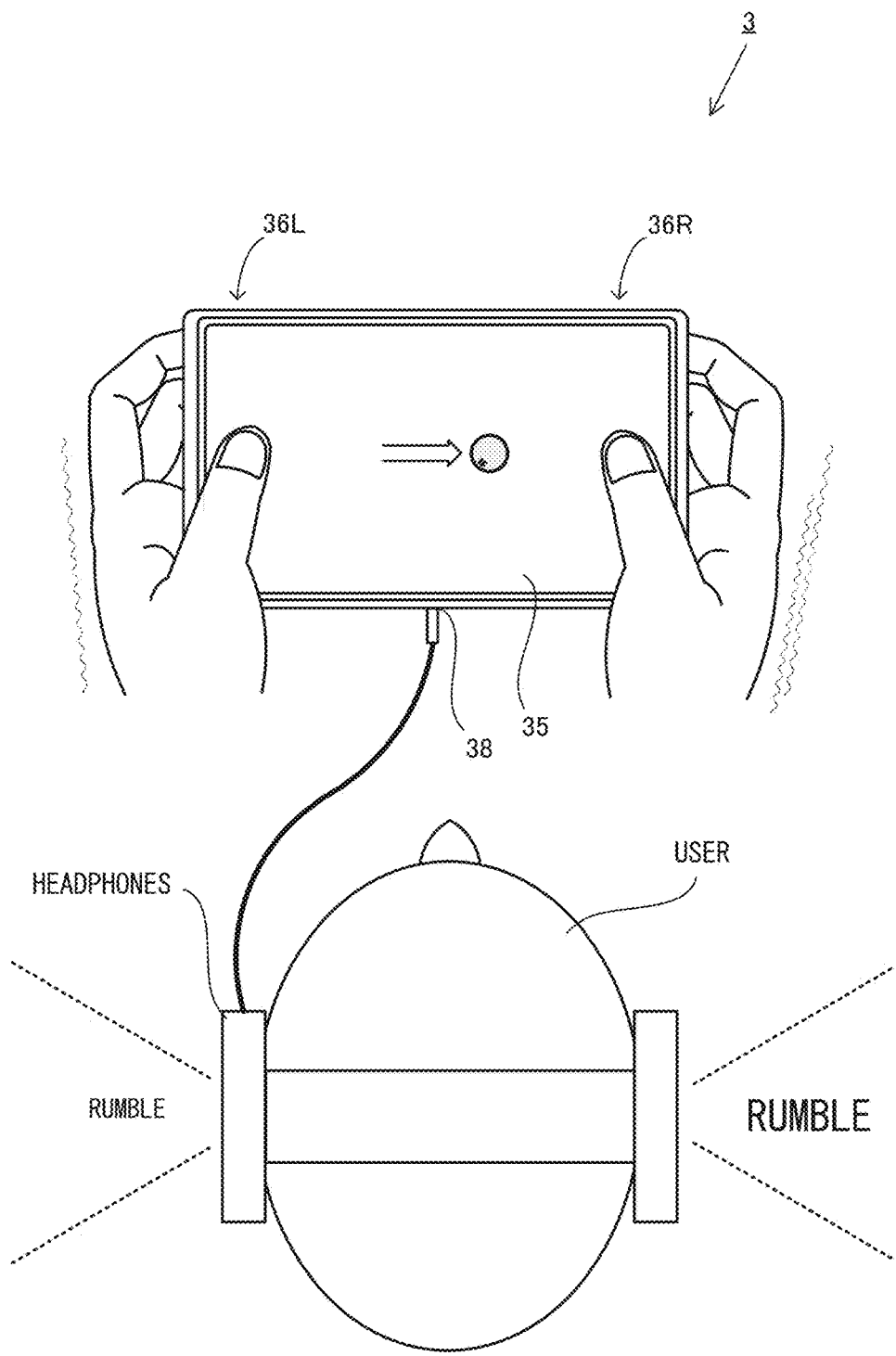
FIG. 6 is a diagram showing a non-limiting example where a game is performed with headphones connected to a sound output terminal 38.

Next, with reference to FIGS. 4 to 6, a description is given of an overview of the processing performed by the information processing apparatus 3, before the description of specific processing performed by the information processing apparatus 3. In the following descriptions, the process of performing a game where a virtual object OBJ displayed on the display screen of the display section 35 is displayed so as to move is used as an example of the information processing performed by the information processing apparatus 3. It should be noted that FIG. 4 is a diagram showing an example where the above game is performed with sounds output from the loudspeakers provided in the information processing apparatus 3. FIG. 5 is diagrams illustrating examples of the spectra of vibrations imparted to the main body of the information processing apparatus 3 and examples of the spectra of sounds output from the loudspeakers provided in the information processing apparatus 3, when the above game is performed. FIG. 6 is a diagram showing an example where the above game is performed with headphones connected to the sound output terminal 38.

In FIG. 4, a virtual object OBJ placed in a virtual world is displayed on the display screen of the display section 35. The virtual object OBJ is displayed on the display screen of the display section 35 so as to move in the virtual world in accordance with a user operation or automatically.

In accordance with the movement of the virtual object OBJ, the main body of the information processing apparatus 3 vibrates and simultaneously, sounds are output from the loudspeakers. For example, in accordance with the display position of the virtual object OBJ displayed on the display screen of the display section 35, the left actuator 373L and the right actuator 373R, which are provided in the main body of the information processing apparatus 3, generate vibrations to occur when the virtual object OBJ moves. As an example, with the use of phantom sensation that stimulates two different points in the user's skin (specifically, the left hand and the right hand of the user holding the main body of the information processing apparatus 3) to cause the user to perceive a pseudo stimulus at one point, the left actuator 373L and the right actuator 373R impart, to the user of the information processing apparatus 3, vibrations for causing the user to perceive the display position of the virtual object OBJ as the vibration source in a pseudo manner (vibrations for causing the display position of the virtual object OBJ to be the position where a pseudo force sense is presented). Further, the pair of stereo loudspeakers (the left sound output section 36L and the right sound output section 36R) provided in the main body of the information processing apparatus 3 output sounds such that the position where the sound sources are localized is the display position of the virtual object OBJ displayed on the display screen of the display section 35. As described above, the display position of the virtual object OBJ, the position to be perceived as the vibration source in a pseudo manner (a pseudo force sense presentation position), and the sound source localization position are substantially matched. This can provide a realistic experience using visual sensation, tactile sensation, and auditory sense to the user. Further, vibrations imparted to the user by the left actuator 373L and the right actuator 373R and sounds output from the left sound output section 36L and the right sound output section 36R are generated by imitating the vibrations and sounds when the virtual object OBJ moves. This can further enhance the reality.

For example, vibrations different from each other are imparted by the left actuator 373L and the right actuator 373R to the main body of the information processing apparatus 3 in a predetermined balance, thereby achieving the above phantom sensation. For example, if the virtual object OBJ is displayed so as to move in an area to the left of the center of the display screen of the display section 35, the amplitude of the vibration imparted by the left actuator 373L to the main body of the information processing apparatus 3 is greater than the amplitude of the vibration imparted by the right actuator 373R to the main body of the information processing apparatus 3. Thus, the vibration to be imparted to the user from the left side is made stronger than the vibration to be imparted to the user from the right side, whereby it is possible to cause the user to perceive as the vibration source the position on the left of the display screen where the virtual object OBJ is displayed so as to move.

Here, as shown in FIG. 5, in the exemplary game, each of the left actuator 373L and the right actuator 373R imparts a vibration having a plurality of frequency components (a vibration having not only a single frequency component) to the main body of the information processing apparatus 3, and each of the loudspeakers outputs a sound having a plurality of frequency components. For example, (A) of FIG. 5 and (B) of FIG. 5 show examples of the spectra of the vibrations imparted to the main body of the information processing apparatus 3 in the above exemplary game and indicate that a vibration in a frequency range having a predetermined width (a vibration in a wide band) is imparted by each of the left actuator 373L and the right actuator 373R to the main body of the information processing apparatus 3. More specifically, a vibration having power in the entire area of the frequency range from a frequency component lower than 10 Hz (hertz) to a frequency component higher than 1 kHz (kilohertz) is imparted by each of the left actuator 373L and the right actuator 373R to the main body of the information processing apparatus 3. Here, the sensory receptors of a human being for receiving cutaneous sensation include Merkel discs, Meissner corpuscles, Pacinian corpuscles, Ruffini endings, and the like. The Merkel discs are regarded as responding to vibrations at 0 to 200 Hz. The Meissner corpuscles are regarded as responding to vibrations at 20 to 100 Hz and regarded as having the highest sensitivity to vibrations near 30 Hz. The Pacinian corpuscles are regarded as responding to vibrations at 100 to 300 Hz and regarded as having the highest sensitivity to vibrations near 200 Hz. The vibrations imparted by the left actuator 373L and the right actuator 373R to the main body of the information processing apparatus 3 include vibrations in the frequency range of 0 to 1 kHz, which is regarded as being able to be felt by a human being or include part of vibrations in this frequency range, and also include frequency components to which these sensory receptors can respond (frequency components in areas A to C shown in (A) of FIG. 5 and (B) of FIG. 5). This makes it possible to reproduce a touch rich in reality and present the touch to the user.

In addition, as shown in FIG. 5, vibrations that can be imparted to the user of the information processing apparatus 3 and sounds that are output from the information processing apparatus 3 can have different spectra. For example, the information processing apparatus 3 can impart, to the user, vibrations around a wide band of 0 to 1000 Hz, which is regarded as being able to be felt by a human being, and can also output sounds around a wide band of 20 to 20000 Hz, which include audio frequencies audible to the human ear. Thus, the vibrations and the sounds can have different spectra by controlling different vibrators (the left actuator 373L, the right actuator 373R, and the stereo loudspeakers) by different control signals.

In the exemplary embodiment, vibration data for imparting vibrations to the main body of the information processing apparatus 3 and sound data for outputting sounds from the information processing apparatus 3 may be prepared separately in advance. In this case, vibration data corresponding to the type of vibrations to be imparted to the user of the information processing apparatus 3 is extracted and read from the prepared vibration data, thereby generating vibration control signals. Further, sound data corresponding to sounds to be output from the information processing apparatus 3 is extracted and read from the prepared sound data, thereby generating sound control signals. It should be noted that in the vibration data, vibration data for imparting a vibration from the left actuator 373L and vibration data for imparting a vibration from the right actuator 373R may be prepared separately. As an example, a pair of left and right pieces of vibration data may be prepared in advance based on the position of the vibration source. Then, when vibrations are imparted to the main body of the information processing apparatus 3, a pair of left and right pieces of vibration data corresponding to the position to be perceived as the vibration source may be read. Further, it goes without saying that also in the sound data, sound data for outputting a sound from the left loudspeaker and sound data for outputting a sound from the right loudspeaker may be prepared separately. Further, sound data prepared in advance may be used as vibration data. Sound data is also data used to vibrate and drive a diaphragm of a loudspeaker and therefore can be used as data for vibrating and driving a vibrator (i.e., vibration data).

In addition, in the exemplary embodiment, a vibration control signal (the left vibration control signal CSL) for driving the left actuator 373L and a vibration control signal (the right vibration control signal CSR) for driving the right actuator 373R may be generated independently of each other, or may be generated by processing a single vibration control signal. For example, in the second case, a single vibration control signal prepared in advance in accordance with the intensity of the vibration for vibrating each actuator can be processed, thereby generating the left vibration control signal CSL and the right vibration control signal CSR.

Next, with reference to FIG. 6, a description is given of the case where the above game is performed with headphones connected to the sound output terminal 38. If headphones have been connected to the sound output terminal 38 of the information processing apparatus 3, sounds corresponding to the movement of the virtual object OBJ are output from the headphones, and simultaneously, the sounds output from the loudspeakers of the information processing apparatus 3 are silenced. This enables the user to play the above game without outputting sounds from the loudspeakers of the information processing apparatus 3 to the outside. This results in a suitable operation environment in a situation where sounds need to be silenced. For example, when the connection terminal has been connected to the sound output terminal 38, the information processing apparatus 3 may disconnect, using a physical circuit, a circuit for supplying sound signals to the loudspeakers (e.g., disconnect a predetermined contact), or may silence the sounds from the loudspeakers by the control of the control section 31 corresponding to the detection of the connection.

In addition, if headphones have been connected to the sound output terminal 38 of the information processing apparatus 3, the magnitudes of vibrations to be imparted to the user of the information processing apparatus 3 in accordance with the movement of the virtual object OBJ also become smaller. For example, as described above, if vibrations in a wide band are imparted by the left actuator 373L and the right actuator 373R to the main body of the information processing apparatus 3, the vibration sound of the imparted vibrations leaks to the surroundings of the information processing apparatus 3. Thus, even if the loudspeakers of the information processing apparatus 3 are silenced, as a result, a sound is output from the information processing apparatus 3 to the outside. If, however, headphones have been connected to the sound output terminal 38 of the information processing apparatus 3, control is performed to also make the vibration sound smaller. This results in a suitable operation environment in a situation where sounds need to be silenced. For example, in accordance with a sound output apparatus selected as the output destination of sounds, the information processing apparatus 3 can differently process vibration signals for driving the left actuator 373L and/or the right actuator 373R, thereby performing different types of vibration control. It should be noted that the process of processing the vibration signals may be performed by the control section 31, or may be performed by the vibration generation section 37. Further, when the different types of vibration control are performed, vibration signals for driving the left actuator 373L and/or the right actuator 373R in first vibration control (e.g., vibration control to be performed when the loudspeakers have been selected as the output destination of sounds), and processed vibration signals used in second vibration control (e.g., vibration control to be performed when headphones or earphones have been selected as the output destination of sounds) and obtained by processing the vibration signals may be stored in advance. In this case, in accordance with a sound output apparatus selected as the output destination of sounds, the information processing apparatus 3 selects either the vibration signals before being processed or the processed vibration signals and performs different types of vibration control.

It should be noted that in the above exemplary embodiment, an example has been used where, if headphones have been connected to the sound output terminal 38 of the information processing apparatus 3, that is, if a different sound output apparatus has been selected, vibrations to be imparted to the user of the information processing apparatus 3 are made smaller. Alternatively, another type of vibration control may be performed in accordance with a selected sound output apparatus. For example, if headphones have been connected to the sound output terminal 38 of the information processing apparatus 3, vibrations to be imparted to the user of the information processing apparatus 3 may be stopped. In this case, if the connection terminal has been connected to the sound output terminal 38, a circuit for supplying vibration signals to the left actuator 373L and the right actuator 373R may be disconnected using a physical circuit (e.g., a predetermined contact may be disconnected), or the driving of the left actuator 373L and the right actuator 373R may be stopped by the control of the control section 31 corresponding to the detection of the connection.

As a first example, if headphones or earphones have been selected as the output destination of sounds (if headphones or earphones have been connected to the sound output terminal 38), the vibration signals are processed so that vibrations for making the vibration sound smaller than before the selection are imparted by the left actuator 373L and/or the right actuator 373R. Specifically, the vibration signals can be processed into vibration signals for reducing the energy of the entire band in which the left actuator 373L and/or the right actuator 373R vibrate or the energy of frequency components in the audible range (e.g., frequency components at 20 to 20000 Hz, which are audio frequencies audible to the human ear), or the vibration signals can be processed into vibration signals in which frequency components in the audible range per se are reduced or removed. It should be noted that if the vibration signals are processed into vibration signals in which frequency components in the audible range per se are reduced or removed, the vibration signals may be processed so that the vibration energy of vibrations of frequency components other than those in the audible range frequency component increases.

As a second example, the vibration signals are processed so that vibrations corresponding to the qualities of sounds (e.g., the volumes of sounds) predicted to be felt as bodily sensation by the user after being output from the sound output apparatus selected as the output destination of sounds are imparted by the left actuator 373L and/or the right actuator 373R. For example, if the output destination of sounds has been switched from a sound output apparatus (e.g., small-diameter loudspeakers) with which relatively small volumes of sounds are predicted to be felt as bodily sensation, to a sound output apparatus (e.g., large-diameter loudspeakers or a sound production apparatus for causing the ears of the user to directly listen to sounds) with which relatively great volumes of sounds are predicted to be felt as bodily sensation, the vibration signals can be processed so that the energy of the vibrations of the left actuator 373L and/or the right actuator 373R increases.

As a third example, the vibration signals are processed so that in accordance with the sound output apparatus selected as the output destination of sounds, the timing of vibrations to be imparted by the left actuator 373L and/or the right actuator 373R to the main body of the information processing apparatus 3 changes. As an example, if the output destination of sounds has been switched to a sound output apparatus disposed at a position distant from the user, the vibration signals are processed so that vibrations corresponding to sounds to be output from the sound output apparatus are imparted to the main body of the information processing apparatus 3 by delaying the vibrations or making the vibrations earlier. Particularly, if the output destination of sounds is switched to loudspeakers included in a stationary monitor or near the monitor and a game image of the exemplary game is displayed on the monitor, the timing to generate sounds and vibrations can be changed in accordance with the situation of a virtual object displayed on the monitor. Specifically, if a virtual object that moves so as to come close to the user holding the information processing apparatus 3 from the monitor is displayed on the monitor, sounds corresponding to the movement of the virtual object displayed on the monitor can be output from the loudspeakers of the monitor, and vibrations based on the timing when the virtual object is assumed to reach the position of the user in the movement can be imparted to the main body of the information processing apparatus 3. In this case, at the timing when the moving virtual object comes closest to the viewpoint of a virtual camera for generating a game image displayed on the monitor, sounds to be output from the loudspeakers of the monitor (sounds corresponding to the movement of the virtual object) are maximum. At the timing when the virtual object is assumed to come closest to the position of the user holding the information processing apparatus 3, vibrations to be imparted by the left actuator 373L and/or the right actuator 373R to the main body of the information processing apparatus 3 (vibrations corresponding to the movement of the virtual object) are maximum.

In addition, in the above description, as a sound output apparatus to output sounds to be listened to by the user holding the information processing apparatus 3, headphones or earphones to be wire-connected to the sound output terminal 38 of the information processing apparatus 3 have been exemplified. Alternatively, a sound output apparatus wirelessly connected to the information processing apparatus 3 may be used. For example, if wireless headphones to be wirelessly connected to the information processing apparatus 3 are used as a sound output apparatus to output sounds to be listened to by the user holding the information processing apparatus 3, the above vibration control may be performed by, for detection, determining whether or not the sound output apparatus has been wirelessly connected to the information processing apparatus 3.

In addition, in the above description, as a sound output apparatus to output sounds that can be listened to also by a person other than the user holding the information processing apparatus 3, the loudspeakers of the information processing apparatus 3 have been exemplified, and as a sound output apparatus to output sounds to be listened to by the user holding the information processing apparatus 3, headphones or earphones have been exemplified. Alternatively, another sound output apparatus may be used. For example, as a sound output apparatus to output sounds to be listened to by the user holding the information processing apparatus 3, highly directive loudspeakers for outputting sounds that can be listen to only by the user. Yet alternatively, when a plurality of users hold apparatuses, a sound output apparatus to output sounds to be listened to by each user holding the apparatus in their hand may be used as loudspeakers to output sounds from the apparatus, and a sound output apparatus to output sounds that can be simultaneously listened to also by a person other than the user holding the apparatus may be loudspeakers to output sounds that can be listened to by the plurality of users (e.g., loudspeakers to output sounds that can be listened to in the entire place where a plurality of users are present).

In addition, in the above exemplary game, the position to be perceived as the vibration source and the position where the sound sources are localized are set in accordance with the position of the virtual object OBJ moving in the virtual world. Alternatively, the position to be perceived as the vibration source in the exemplary embodiment does not need to be the position of an image displayed so as to move. For example, the vibrations to be imparted by the left actuator 373L and the right actuator 373R and the sounds to be output from the loudspeakers may be controlled so that a virtual object fixedly displayed on the display screen of the display section 35 is the vibration source and the sound source. Further, if an image obtained by capturing the real world is displayed on the display screen of the display section 35, the vibrations to be imparted by the left actuator 373L and the right actuator 373R and the sounds to be output from the loudspeakers may be controlled so that the position of a captured object in the real world that appears in the image is the vibration source and the sound source.

In addition, in the above exemplary game, an example has been used where vibrations, each having a plurality of frequency components, are imparted to the main body of the information processing apparatus 3, and simultaneously, sounds, each having a plurality of frequency components, are output. Alternatively, other vibrations may be imparted to the main body of the information processing apparatus 3, or other sounds may be output. For example, vibrations, each having a single frequency component, may be imparted to the main body of the information processing apparatus 3, and sounds, each having a single frequency component, may be output.

Figure 7:
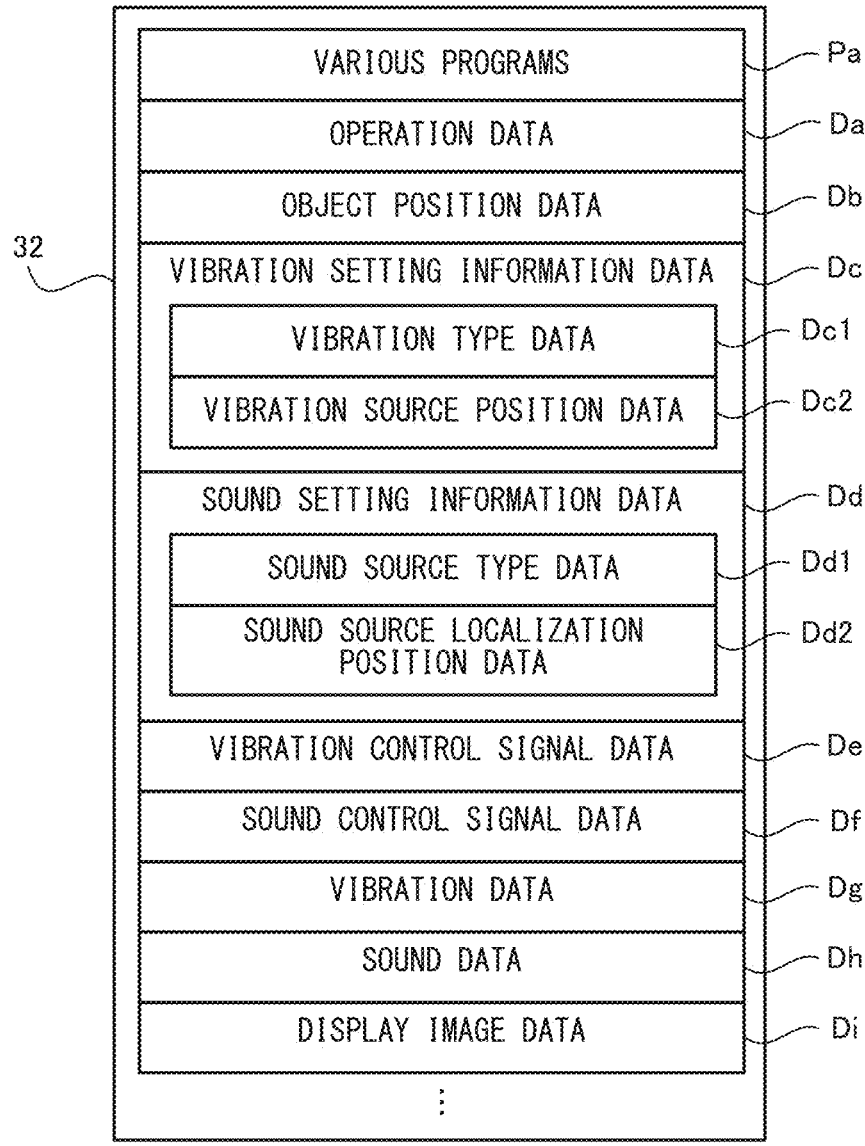
FIG. 7 is a diagram showing non-limiting examples of main data and programs stored in a storage section 32 of the information processing apparatus 3.

Next, a detailed description is given of the processing performed by the information processing apparatus 3. First, with reference to FIG. 7, main data used in the processing is described. FIG. 7 is a diagram showing examples of main data and programs stored in the storage section 32 of the information processing apparatus 3. It should be noted that in the following exemplary processing, a description is given using the information processing when the game processing of the above exemplary game is performed.

As shown in FIG. 7, the following are stored in the data storage area of the storage section 32: operation data Da; object position data Db; vibration setting information data Dc; sound setting information data Dd; vibration control signal data De; sound control signal data Df; vibration data Dg; sound data Dh; display image data Di; and the like. It should be noted that the storage section 32 may store, as well as the data shown in FIG. 7, data and the like necessary for the processing, such as data used in an application to be executed. Further, in the program storage area of the storage section 32, various programs Pa included in the information processing program are stored. For example, the various programs Pa include a vibration generation program for generating vibration control signals to impart vibrations to the information processing apparatus 3, a sound generation program for generating sound control signals to output sounds from the information processing apparatus 3, an image display program for displaying an image on the display section 35, and the like.

The operation data Da is data representing the content of the operation performed on the input section 34 and includes, for example, data representing the touch position of a touch operation on the touch panel 341. It should be noted that if the input section 34 includes a sensor for detecting the orientation and the motion of the main body of the information processing apparatus 3, the operation data Da may include data for calculating the orientation and the motion of the main body of the information processing apparatus 3 (e.g., data representing the acceleration generated in the main body of the information processing apparatus 3 and data representing the angular velocity of the main body of the information processing apparatus 3).

The object position data Db is data representing the position of a virtual object OBJ moving in a virtual world (see FIGS. 4 and 5).

The vibration setting information data Dc includes vibration type data Dc1, vibration source position data Dc2, and the like. The vibration type data Dc1 is data representing the type of vibrations to be imparted to the user of the information processing apparatus 3. The vibration source position data Dc2 is data representing the position to be perceived as the vibration source by the user of the information processing apparatus 3.

The sound setting information data Dd includes sound source type data Dd1, sound source localization position data Dd2, and the like. The sound source type data Dd1 is data representing the type of sounds to be output from the information processing apparatus 3. The sound source localization position data Dd2 is data representing the sound source localization position of sounds to be output from the information processing apparatus 3.

The vibration control signal data De is data representing vibration control signals to be output from the control section 31 to the vibration generation section 37 (the left vibration control signal CSL and the right vibration control signal CSR; see FIG. 3). The sound control signal data Df is data representing sound control signals to be output from the control section 31 to the sound output section 36 (the left sound control signal and the right sound control signal).

The vibration data Dg is data prepared in advance for generating vibration control signals and is stored for each type of vibration to be imparted to the user of the information processing apparatus 3 (e.g., for each virtual object for which vibrations are generated). The sound data Dh is data prepared in advance for generating sound control signals and is stored for each type of sound to be output from the information processing apparatus 3 (e.g., for each virtual object for which sounds are produced or each type of BGM).

The display image data Di is data for generating an image of each virtual object such as the virtual object OBJ, a background image, and the like and displaying the generated images on the display section 35.

Figure 8:
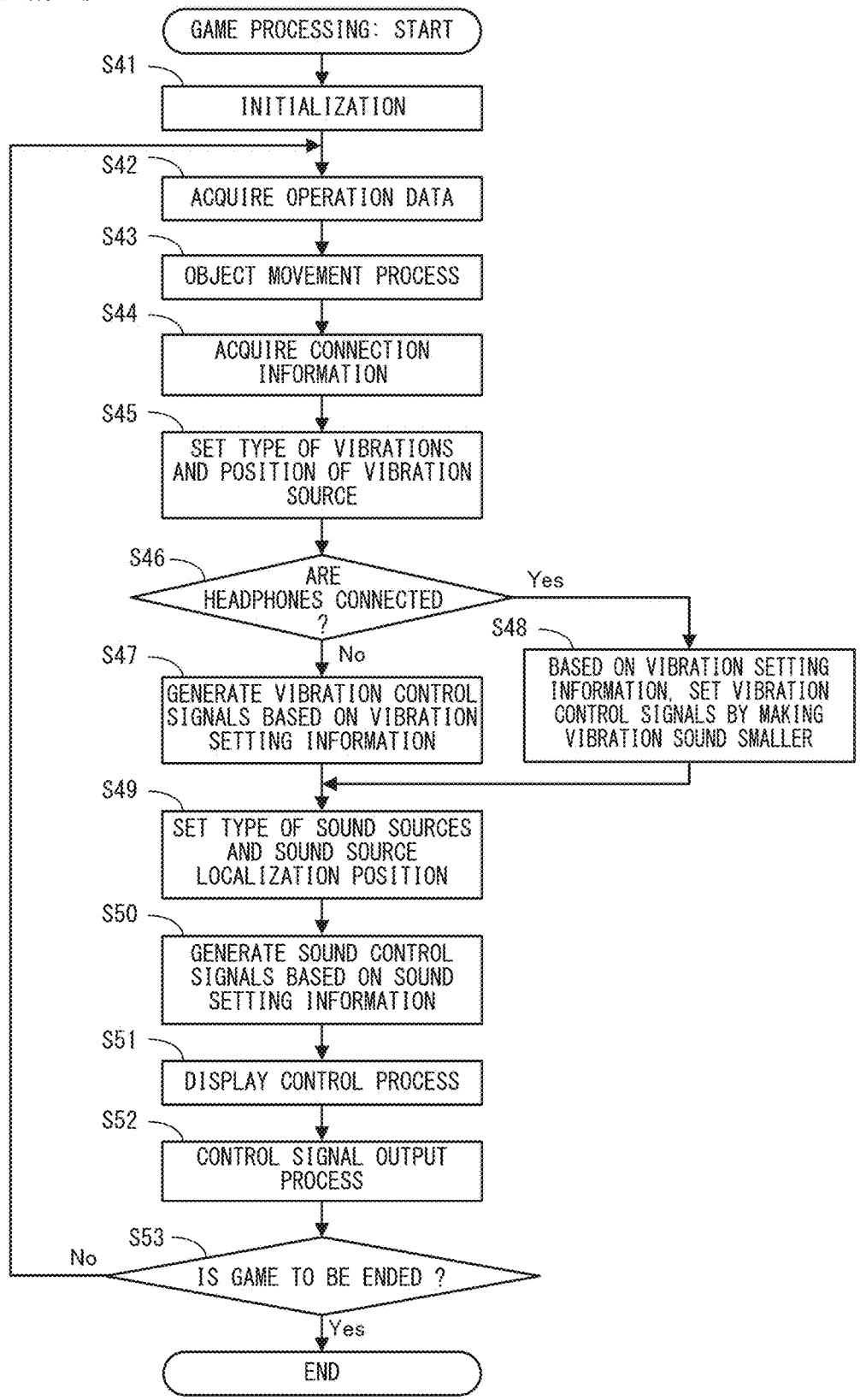
FIG. 8 is a flow chart showing a non-limiting example of game processing performed by the information processing apparatus 3.

Next, with reference to FIG. 8, a detailed description is given of the game processing, which is an example of the information processing performed by the information processing apparatus 3. It should be noted that FIG. 8 is a flow chart showing an example of the game processing performed by the information processing apparatus 3. Here, in the flow chart shown in FIG. 8, a description is given mainly of, in the processing performed by the information processing apparatus 3, the process of outputting vibrations and sounds corresponding to the movement of the virtual object OBJ in the virtual world in the above exemplary game. The detailed descriptions of other processes not directly related to these processes are omitted. Further, in FIG. 8, all of the steps performed by the control section 31 are abbreviated as "S".

The CPU of the control section 31 initializes a memory and the like of the storage section 32 and loads the information processing program from the program storage section 33 into the memory. Then, the CPU starts the execution of the information processing program. The flow chart shown in FIG. 8 is a flow chart showing the processing performed after the above processes are completed.

It should be noted that the processes of all of the steps in the flow chart shown in FIG. 8 are merely illustrative. Thus, the processing order of the steps may be changed, or another process may be performed in addition to and/or instead of the processes of all of the steps, so long as similar results are obtained. Further, in the exemplary embodiment, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 8, the control section 31 performs initialization (step 41), and proceeds to the next step. For example, the control section 31 constructs a virtual world to be displayed on the display section 35 and initializes parameters. As an example, the control section 31 places the virtual object OBJ at an initial position in the virtual world and sets the object position data Db. Further, the control section 31 sets the display range to be displayed on the display screen of the display section 35 for the virtual world.

Next, the control section 31 acquires operation data from the input section 34 and updates the operation data Da (step 42), and the processing proceeds to the next step.

Next, the control section 31 performs the process of causing the virtual object OBJ to move in the virtual world (step 43), and the processing proceeds to the next step. For example, the control section 31 causes the virtual object OBJ to move at a moving speed determined in advance along a movement path determined in advance in the virtual world and updates the object position data Db using the position of the virtual object OBJ after the movement. As another example, if the control section 31 causes the virtual object OBJ to move in accordance with an operation on the input section 34 (including the operation of moving or tilting the main body of the information processing apparatus 3), the control section 31 causes the virtual object OBJ to move in the virtual world in accordance with the operation data acquired in the above step 42 and updates the object position data Db using the position of the virtual object OBJ after the movement.

Next, the control section 31 acquires, from the sound output section 36, connection information indicating the presence or absence of a connection to the sound output terminal 38 (step 44), and the processing proceeds to the next step. For example, if the sound output section 36 has output a sound switching signal indicating that a connection terminal has been connected to the sound output terminal 38 and the sound output destination has been switched, the control section 31 acquires the sound switching signal as connection information.

Next, the control section 31 sets the type of vibrations and the position of the vibration source (step 45), and the processing proceeds to the next step. For example, based on the vibration generation program and the type of the virtual object OBJ placed in the virtual world, the control section 31 sets the type of vibrations when the virtual object OBJ moves. Then, the control section 31 updates the vibration type data Dc1 using data representing the type of vibrations. Further, based on the vibration generation program, the control section 31 sets the position of the vibration source such that the position of the virtual object OBJ indicated by the object position data Db is perceived as the vibration source by the user. Then, the control section 31 updates the vibration source position data Dc2 using data representing the set position.

Next, based on the connection information, the control section 31 determines whether or not headphones are connected to the sound output terminal 38 (step 46). For example, if the sound switching signal has been output from the sound output section 36, the control section 31 determines that headphones are not connected to the sound output terminal 38. Then, if headphones are not connected to the sound output terminal 38, the processing proceeds to step 47. If, on the other hand, headphones are connected to the sound output terminal 38, the processing proceeds to step 48.

In step 47, based on vibration setting information, the control section 31 sets vibration control signals, and the processing proceeds to step 49. For example, based on the vibration generation program and the vibration setting information data Dc (the vibration type data Dc1 and the vibration source position data Dc2), the control section 31 generates vibration control signals (the left vibration control signal CSL and the right vibration control signal CSR to be output to the vibration generation section 37; see FIG. 3) using vibration data read from the vibration data Dg and stores the vibration control signals in the vibration control signal data De. Specifically, the control section 31 reads data from the vibration data Dg and generates the left vibration control signal CSL and the right vibration control signal CSR corresponding to the vibrations of the type indicated by the vibration type data Dc1, so that the vibrations of the type indicated by the vibration type data Dc1 are imparted to the main body of the information processing apparatus 3, and the position indicated by the vibration source position data Dc2 is perceived as the vibration source of the vibrations.

Meanwhile, in step 48, based on vibration setting information, the control section 31 sets vibration control signals by making the vibration sound smaller, and the processing proceeds to step 49. For example, based on the vibration generation program and the vibration setting information data Dc (the vibration type data Dc1 and the vibration source position data Dc2), the control section 31 generates vibration control signals (the left vibration control signal CSL and the right vibration control signal CSR to be output to the vibration generation section 37; see FIG. 3) using vibration data read from the vibration data Dg so that vibrations are imparted that have magnitudes smaller than the magnitudes of the vibrations to be imparted to the user based on the vibration control signals generated in the above step 47. Then, the control section 31 stores the generated vibration control signals in the vibration control signal data De. Specifically, the control section 31 reads data from the vibration data Dg and generates the left vibration control signal CSL and the right vibration control signal CSR corresponding to the vibrations of the type indicated by the vibration type data Dc1, so that the vibrations of the type indicated by the vibration type data Dc1 are imparted to the main body of the information processing apparatus 3, and the position indicated by the vibration source position data Dc2 is perceived as the vibration source of the vibrations. Then, the control section 31 adjusts the left vibration control signal CSL and the right vibration control signal CSR so that the magnitudes of the vibrations are relatively small. Then, the control section 31 outputs the adjusted left vibration control signal CSL and right vibration control signal CSR. It should be noted that in the above step 48, the control section 31 may make settings so that vibrations are not imparted to the main body of the information processing apparatus 3. In this case, if vibration control signals for driving the left actuator 373L and the right actuator 373R are set in the vibration control signal data De, the control section 31 may delete the data, thereby making settings so that vibrations are not imparted to the main body of the information processing apparatus 3.

In step 49, the control section 31 sets the type of sound sources and the position where the sound sources are localized, and the processing proceeds to the next step. For example, based on the sound generation program and the type of the virtual object OBJ placed in the virtual world, the control section 31 sets the type of sounds when the virtual object OBJ moves. Then, the control section 31 updates the sound source type data Dd1 using data representing the type of sounds. Further, based on the sound generation program, the control section 31 sets the sound source localization position such that the position of the virtual object OBJ indicated by the object position data Db is the sound source localization position of the sounds. Then, the control section 31 updates the sound source localization position data Dd2 using data representing the sound source localization position.

Next, based on sound setting information, the control section 31 sets sound control signals (step 50), and the processing proceeds to the next step. For example, based on the sound generation program and the sound setting information data Dd (the sound source type data Dd1 and the sound source localization position data Dd2), the control section 31 generates sound control signals (the left sound control signal and the right sound control signal to be output to the sound output section 36) and stores the sound control signals in the sound control signal data Df. Specifically, the control section 31 reads data from the sound data Dh and generates the left sound control signal and the right sound control signal, so that the sounds of the type indicated by the sound source type data Dd1 are output from the stereo loudspeakers of the information processing apparatus 3 or a sound output apparatus (e.g., headphones) connected to the sound output terminal 38, and the position indicated by the sound source localization position data Dd2 is the sound localization position.

Next, the control section 31 performs a display control process (step 51), and the processing proceeds to the next step. For example, based on an image generation program and the object position data Db, the control section 31 performs the process of generating an image of the virtual world in which the virtual object OBJ is placed, and displaying on the display section 35 the image of the virtual world in the set display range.

Next, the control section 31 performs a control signal output process (step 52), and the processing proceeds to the next step. For example, the control section 31 outputs to the vibration generation section 37 the left vibration control signal CSL and the right vibration control signal CSR indicated by the vibration control signal data De. Consequently, the vibration generation section 37 generates a vibration corresponding to the left vibration control signal CSL from the left actuator 373L and generates a vibration corresponding to the right vibration control signal CSR from the right actuator 373R. Further, the control section 31 outputs to the sound output section 36 the left sound control signal and the right sound control signal indicated by the sound control signal data Df. Consequently, if a sound output apparatus is not connected to the sound output terminal 38, the sound output section 36 outputs a sound corresponding to the left sound control signal from the left loudspeaker and outputs a sound corresponding to the right sound control signal from the right loudspeaker. Further, if a sound output apparatus is connected to the sound output terminal 38, the sound output section 36 outputs a sound corresponding to the left sound control signal from a left sound production apparatus of the sound output apparatus and outputs a sound corresponding to the right sound control signal from a right sound production apparatus.

Next, the control section 31 determines whether or not the game processing is to be ended (step 53). Examples of conditions for ending the game processing include: the satisfaction of the condition under which the game processing is ended; and the fact that the user has performed the operation of ending the game processing. If the game processing is not to be ended, the control section 31 returns to the above step 42 and repeats the process thereof. If the game processing is to be ended, the control section 31 ends the processing indicated by the flow chart.

As described above, in the game processing according to the above exemplary embodiment, different types of vibration control are performed in accordance with a sound output apparatus selected as the output destination of sounds. This makes it possible to control vibrations to be imparted to the user of the information processing apparatus 3, not in a single form but in various forms. For example, even if headphones, earphones, or the like are selected as the output destination of sounds so that sound is not output to the surroundings of the information processing apparatus 3, a vibration sound may leak to the surroundings of the information processing apparatus 3 by imparting vibrations to the user of the information processing apparatus 3. However, the vibrations to be imparted to the user of the information processing apparatus 3 are controlled in accordance with the sound output apparatus selected as the output destination of sounds. This also makes it possible to prevent the leakage of the vibration sound.

In addition, vibrations in a wide band imparted by the left actuator 373L and the right actuator 373R are imparted to the user of the information processing apparatus 3, whereby it is possible to impart vibrations rich in variety to the user. Further, in the game processing according to the above exemplary embodiment, it is possible to cause the user to perceive as the vibration source the position where the virtual object OBJ is placed in the virtual world. Here, in the game processing according to the above exemplary embodiment, sounds in a wide band when the virtual object OBJ moves are output such that the position where the virtual object OBJ is placed in the virtual world is the sound source localization position of the sounds output from the information processing apparatus 3. Further, if the virtual object OBJ is placed in the virtual world displayed on the display screen of the display section 35, the position where the virtual object OBJ is placed is displayed on the display screen of the display section 35. As described above, the position of the virtual object OBJ is presented using tactile sensation based on vibrations in a wide band, auditory sense based on sounds in a wide band, and visual sensation based on the display of a moving object on the display screen, whereby it is possible to impart unconventional bodily sensation rich in reality to the user.

It should be noted that the above descriptions are given using the example where the information processing apparatus 3 performs information processing (game processing). Alternatively, another apparatus may perform at least some of the processing steps in the information processing. For example, if the information processing apparatus 3 is further configured to communicate with another apparatus (e.g., another server, another game apparatus, or another mobile terminal), the other apparatus may cooperate to perform the processing steps of the information processing. As an example, another apparatus may perform at least one of the virtual world image generation process, the vibration control signal generation process, and the sound control signal generation process, and the information processing apparatus 3 may acquire image data and control signals indicating the result of the process. Another apparatus may thus perform at least some of the processing steps in the information processing, thereby enabling processing similar to the above information processing. Further, the above information processing can be performed by a processor or the cooperation of a plurality of processors, the processor or the plurality of processors included in an information processing system including at least one information processing apparatus. Further, in the above exemplary embodiment, the processing indicated in the above flow chart is performed by the control section 31 of the information processing apparatus 3 executing a predetermined game program. Alternatively, a part or all of the information processing indicated in the flow chart may be performed by a dedicated circuit included in the information processing apparatus 3.

In addition, if a sound input section such as a microphone is provided in the information processing apparatus 3, different types of vibration control may be performed in accordance with the sound input from the sound input section. As a first example, based on the sound input from the sound input section, it may be determined whether or not the surroundings of the information processing apparatus 3 are in a noisy situation, and then, different types of vibration control may be performed in accordance with the result of the determination. Specifically, if the loudness of the sound input from the sound input section is greater than a predetermined threshold, it is determined that the surroundings of the information processing apparatus 3 are in a noisy situation, and therefore, the leakage of the vibration sound has a small influence on the surroundings. In this case, even if a sound output apparatus (e.g., headphones or earphones) to output sounds to be listened to by the user holding the information processing apparatus 3 is the sound output destination, vibrations having the same magnitudes as, or magnitudes greater than, the magnitudes of vibrations to be imparted to the user when a sound output apparatus (e.g., a megaphone) to output a sound that can be listened to also by a person other than the user is the sound output destination may be imparted. Thus, if the surroundings of the information processing apparatus 3 are in a noisy situation, the information processing apparatus 3 can be used without lowering the levels of the intensities of vibrations. This can enhance the sense of immersion of the user of the information processing apparatus 3. If, on the other hand, the loudness of the sound input from the sound input section is the same as or smaller than the predetermined threshold, it is determined that the surroundings of the information processing apparatus 3 are in a quiet situation, and therefore, the leakage of the vibration sound has a great influence on the surroundings. In this case, if a sound output apparatus to output sounds to be listened to by the user holding the information processing apparatus 3 is the sound output destination, vibrations are imparted that are weaker than the magnitudes of vibrations to be imparted to the user when a sound output apparatus to output sounds that can be listened to also by a person other than the user is the sound output destination. Thus, if the surroundings of the information processing apparatus 3 are in a quiet situation, the information processing apparatus 3 can be used by lowering the levels of the intensities of vibrations. This can reduce the vibration sound, which becomes a nuisance to the surroundings. It should be noted that the threshold for determining the situation of the surroundings of the information processing apparatus 3 may be set in advance by the information processing apparatus 3, or may be set by the user of the information processing apparatus 3.

As a second example, different types of vibration control may be performed based on the magnitude of the input sound indicated by the sound input from the sound input section or the loudness of the vibration sound included in the sound input. Specifically, if the input sound indicated by the sound input from the sound input section or the loudness of the vibration sound is greater than a predetermined threshold, the levels of the intensities of vibrations to be imparted to the user of the information processing apparatus 3 are lowered so that the loudness of the input sound or the vibration sound is the same as or smaller than the threshold. Then, vibration control corresponding to the loudness of the input sound or the vibration sound is performed in real time while the user is operating the information processing apparatus 3. In this case, the information processing apparatus 3 may have the following configuration. An exemplary configuration of the information processing apparatus outputs predetermined sounds from a predetermined sound output apparatus and simultaneously vibrates a predetermined vibration apparatus. The information processing apparatus includes comparison means and vibration control means. The comparison means compares the loudness of the sound from the sound input apparatus with predetermined loudness. The vibration control means performs vibration control for vibrating the vibration apparatus. The vibration control means performs different types of vibration control in accordance with the result of the comparison made by the comparison means. It should be noted that the threshold used in the above vibration control may be set in advance by the information processing apparatus 3, or may be set by the user of the information processing apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the information processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step of the above information processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. As an example, three or more actuators may impart vibrations to the information processing apparatus, or three or more loudspeakers may output sounds from the information processing apparatus. Alternatively, the information processing apparatus may include a plurality of display sections. Further, in the above description, a mobile apparatus (e.g., a tablet terminal) has been used as an example of the information processing apparatus 3. Alternatively, the information processing apparatus 3 may be a portable apparatus larger than a mobile apparatus. Here, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above mobile apparatus.

In addition, the information processing program may be supplied to the information processing apparatus 3 not only through an external storage medium such as the external memory 45, but also through a wired or wireless communication link. Further, the information processing program may be stored in advance in a non-volatile storage device included in the information processing apparatus 3. It should be noted that examples of an information storage medium having stored therein the information processing program may include CD-ROMs, DVDs, optical disk storage media similar to these, flexible disks, hard disks, magneto-optical disks, and magnetic tapes, as well as non-volatile memories. Alternatively, an information storage medium having stored therein the information processing program may be a volatile memory for storing the information processing program. It can be said that such a storage medium is a storage medium readable by a computer or the like. For example, it is possible to provide the above various functions by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing apparatus, an information processing program, an information processing system, an information processing method, and the like in order, for example, to perform vibration control for vibrating a vibration apparatus.

What is claimed is:

1. An information processing apparatus configured to output sound selectively from a plurality of sound output apparatuses, each sound output apparatus including at least one speaker, and to control vibration of a vibration apparatus including at least one actuator, the information processing apparatus comprising one or more processors configured to:
generate one or more sound signals and a vibration signal for vibrating the vibration apparatus;
select, from the plurality of sound output apparatuses, one or more sound output apparatuses to output sound based on the generated sound signal;
output the generated sound signal from the selected sound output apparatus; and
selectively process the generated vibration signal according to which one or more of the plurality of sound output apparatuses are selected to output sound based on the generated sound signal, wherein different processing of the generated vibration signal corresponds to different selections of one or more of the plurality of sound output apparatuses to output sound.

2. The information processing apparatus according to claim 1, wherein the generated vibration signal includes a plurality of frequency components and at least one of the different processing of the generated vibration signal applies, to the generated vibration signal, processing that includes increasing level of a specific range of frequency components in the generated vibration signal.

3. The information processing apparatus according to claim 1, wherein
one or more of the different processing of the generated vibration signal includes reducing frequency components in an audible range of the generated vibration signal from a first level to a second level.

4. The information processing apparatus according to claim 1, wherein
one or more of the different processing of the generated vibration signal includes changing a magnitude of energy for vibrating the vibration apparatus in the generated vibration signal from a first level to a second level.

5. The information processing apparatus according to claim 1, further comprising a storage unit configured to store the generated vibration signal for vibrating the vibration apparatus and the processed vibration signal obtained by processing the generated vibration signal.

6. The information processing apparatus according to claim 1, wherein
the plurality of sound output apparatuses include a first sound output apparatus configured to output a sound to a user and a person other than the user, and a second sound output apparatus configured to output a sound to the user, and
in the selection, one of the first sound output apparatus and the second sound output apparatus is selected.

7. The information processing apparatus according to claim 6, wherein
when the second sound output apparatus has been selected in the selection, the generated vibration signal is processed such that a vibration sound to be produced by the vibration apparatus becomes smaller as compared to a vibration sound of the generated vibration signal.

8. The information processing apparatus according to claim 7, wherein
when the second sound output apparatus has been selected in the selection, processing the generated vibration signal includes reducing frequency components in an audible range of the generated vibration signal, thereby making the processed vibration sound smaller as compared to a vibration sound of the generated vibration signal.

9. The information processing apparatus according to claim 7, wherein
when the second sound output apparatus has been selected in the selection, energy for vibrating the vibration apparatus based on the processed vibration signal for vibrating the vibration apparatus is made smaller, thereby making the processed vibration sound smaller as compared to a vibration sound of the generated vibration signal.

10. The information processing apparatus according to claim 6, wherein
the first sound output apparatus is a loudspeaker.

11. The information processing apparatus according to claim 6, wherein
the second sound output apparatus is headphones.

12. The information processing apparatus according to claim 1, wherein
the generated vibration signal is a signal including frequency components in an audible range.

13. The information processing apparatus according to claim 1, wherein
the generated vibration signal is an analog signal.

14. The information processing apparatus according to claim 1, wherein
the information processing apparatus is a portable apparatus into which the vibration apparatus and at least one of the plurality of sound output apparatuses are built.

15. The information processing apparatus according to claim 14, wherein the information processing apparatus further comprises a display screen,
the one or more processors are further configured to control an image to be displayed on the display screen,
in outputting the generated sound signal, a sound is controlled in accordance with an image to be displayed on the display screen, and
the vibrating of the vibration apparatus is controlled based on the processed vibration signal and in accordance with the image to be displayed on the display screen.

16. The information processing apparatus according to claim 14, wherein
the vibration apparatus built into the information processing apparatus is provided with a left vibration generator on the left of a main body of the portable apparatus and a right vibration generator on the right of the main body of the portable apparatus, and
the vibration of the vibration apparatus is performed for the left vibration generator and the right vibration generator.

17. The information processing apparatus according to claim 14, wherein
the at least one sound output apparatus built into the information processing apparatus is stereo loudspeakers, and
in outputting the generated sound signal, stereo sound is output to the sound output apparatus.

18. The information processing apparatus according to claim 1, wherein
vibration energy for vibrating the vibration apparatus is controlled in accordance with volumes of sounds output from the plurality of sound output apparatuses.

19. The information processing apparatus according to claim 18, wherein
the vibration energy is controlled so that the greater the volumes of the sounds, the greater the vibration energy.

20. The information processing apparatus according to claim 1, wherein
at least one of the different processing of the vibration signal includes shifting timing of vibrating the vibration apparatus in the generated vibration signal by a predetermined time to vibrate the vibration apparatus by a vibration synchronized with the output of the generated sound signal from the selected sound output apparatus.

21. A non-transitory computer-readable storage medium storing an information processing program which, when executed by a computer included in an information processing apparatus configured to output sound selectively from a plurality of sound output apparatuses, each sound output apparatus including at least one speaker, and to control vibration of a vibration apparatus including at least one actuator, causes the information processing program to perform operations comprising:
generating one or more sound signals and a vibration signal for vibrating the vibration apparatus;
selecting, from the plurality of sound output apparatuses, one or more sound output apparatuses to output sound based on the generated sound signal;
outputting the generated sound signal from the selected sound output apparatus; and
selectively process the generated vibration signal according to which one or more of the plurality of sound output apparatuses are selected to output sound based on the generated sound signal, wherein different processing of the generated vibration signal corresponds to different selections of one or more of the plurality of sound output apparatuses to output sound.

22. An information processing system, including a plurality of apparatuses capable of communicating with each other, and configured to output sound selectively from a plurality of sound output apparatuses, each sound output apparatus including at least one speaker, and to control vibration of a vibration apparatus including at least one actuator, the information processing system comprising one or more processors configured to:
generate one or more sound signals for output and a vibration signal for vibrating the vibration apparatus;
select, from the plurality of sound output apparatuses, one or more sound output apparatuses to output sound based on the generated sound signal;
output the generated sound signal from the selected sound output apparatus; and
selectively process the generated vibration signal according to which one or more of the plurality of sound output apparatuses are selected to output sound based on the generated sound signal, wherein different processing of the generated vibration signal corresponds to different selections of one or more of the plurality of sound output apparatuses to output sound.

23. An information processing method performed by a processor or cooperation of a plurality of processors, the processor or the plurality of processors included in a system including at least one apparatus configured to output sound selectively from a plurality of sound output apparatuses, each sound output apparatus including at least one speaker, and to control vibration of a vibration apparatus including at least one actuator, the information processing method comprising:
generating one or more sound signals and a vibration signal for vibrating the vibration apparatus;

selecting, from the plurality of sound output apparatuses, one or more sound output apparatuses to output the sound based on the generated sound signal;

outputting the generated sound signal from the selected sound output apparatus; and selectively process the generated vibration signal according to which one or more of the plurality of sound output apparatuses are selected to output sound based on the generated sound signal, wherein different processing of the generated vibration signal corresponds to different selections of one or more of the plurality of sound output apparatuses to output sound.

24. An information processing system comprising:
a vibration apparatus including at least one actuator;
a plurality of speakers; and
one or more processors configured to control the information processing system to at least:
generate one or more sound signals;
control supply of the sound signals to the speakers;
generate one or more vibration control signals for controlling the vibration apparatus; and
selectively process at least one of the vibration control signals according to which one or more of the plurality of speakers are supplied with sound signals, wherein a first processing of the generated vibration signal is performed when one or more sound output apparatuses of the plurality of sound output apparatuses are supplied with the sound signals and a second processing of the generated vibration signal is performed when one or more other sound output apparatuses of the plurality of sound output apparatuses are supplied with the sound signals.

25. The information processing system of claim 24, wherein the one or more processors are further configured to perform vibration control for vibrating the vibration apparatus based on the at least one selectively processed vibration control signal, the vibration control based on the at least one selectively processed vibration control signal producing a vibration having a plurality of frequency components.

26. The information processing system of claim 24, wherein:
the vibration apparatus includes a first vibration actuator and a second vibration actuator;
generating the one or more vibration control signals includes generating a first vibration control signal for the first vibration actuator and a second vibration control signal for the second vibration actuator, the second vibration control signal being different from the first vibration control signal;
both the first and the second vibration control signals are selectively processed, based on which one or more of the plurality of speakers are supplied with sound signals, to produce a modified first vibration control signal for the first vibration actuator and a modified second vibration control signal for the second vibration actuator; and
the one or more processors are further configured to perform vibration control for vibrating the first vibration actuator based on the modified first vibration control signal and for vibrating the second vibration actuator based on the modified second vibration control signal.

27. The information processing system of claim 24, wherein at least one of the different processing of the at least one of the vibration control signals includes reducing level of frequency components in a first frequency component range of the at least one of the vibration control signals from a first level to a second level, and increasing level of frequency components in a second frequency component range of the at least one of the vibration control signals from a third level to a fourth level.

* * * * *